(12) United States Patent
Ulrich et al.

(10) Patent No.: US 10,560,293 B2
(45) Date of Patent: Feb. 11, 2020

(54) CIRCUITS FOR EFFICIENT DETECTION OF VECTOR SIGNALING CODES FOR CHIP-TO-CHIP COMMUNICATION

(71) Applicant: Kandou Labs, S.A., Lausanne (CH)

(72) Inventors: Roger Ulrich, Bern (CH); Peter Hunt, Northampton (GB)

(73) Assignee: KANDOU LABS, S.A., Lausanne (CH)

( * ) Notice: Subject to any disclaimer, the term of this patent is extended or adjusted under 35 U.S.C. 154(b) by 0 days.

(21) Appl. No.: 16/225,206

(22) Filed: Dec. 19, 2018

(65) Prior Publication Data

US 2019/0123943 A1 Apr. 25, 2019

Related U.S. Application Data

(63) Continuation of application No. 15/812,917, filed on Nov. 14, 2017, now Pat. No. 10,164,809, which is a
(Continued)

(51) Int. Cl.
*H04L 25/49* (2006.01)
*H04L 25/02* (2006.01)
(Continued)

(52) U.S. Cl.
CPC .......... *H04L 25/4917* (2013.01); *H04L 25/02* (2013.01); *H04L 25/0274* (2013.01);
(Continued)

(58) Field of Classification Search
CPC combination set(s) only.
See application file for complete search history.

(56) References Cited

U.S. PATENT DOCUMENTS 3,636,463 A   1/1972 Ongkiehong
3,824,494 A   7/1974 Wilcox
(Continued)

FOREIGN PATENT DOCUMENTS

WO   2018052657 A1   3/2018

OTHER PUBLICATIONS

Anadigm, "Using the Anadigm Multiplier CAM", Design Brief 208, www.anadigm.com, Copyright 2002, 2002, (6 pages).
(Continued)

*Primary Examiner* — Linda Wong
(74) *Attorney, Agent, or Firm* — Invention Mine LLC

(57) ABSTRACT

In a detection circuit, inputs correspond to received indications of vector signaling code words received by a first integrated circuit from a second integrated circuit. With four inputs, the circuit compares a first pair to obtain a first difference result and compares a second pair, disjoint from the first pair, to obtain a second difference result. The first and second difference results are then summed to form an output function. A system might use a plurality of such detection circuits to arrive at an input word. The circuit can include amplification, equalization, and input selection with efficient code word detection. The vector signaling code can be a Hadamard matrix code encoding for three input bits. The circuit might also have frequency-dependent gain, a selection function that directs one of the summation function result or the first difference result to the output function, variable gain, and/or a slicer.

12 Claims, 8 Drawing Sheets

Related U.S. Application Data continuation of application No. 15/271,065, filed on Sep. 20, 2016, now Pat. No. 9,819,522, which is a continuation of application No. 15/070,911, filed on Mar. 15, 2016, now Pat. No. 9,450,791, which is a continuation of application No. 13/895,206, filed on May 15, 2013, now Pat. No. 9,288,082.

(51) Int. Cl.
   *H04L 25/14* (2006.01)
   *H04L 25/08* (2006.01)
   *H04L 25/03* (2006.01)

(52) U.S. Cl.
   CPC .... *H04L 25/0294* (2013.01); *H04L 25/03006* (2013.01); *H04L 25/03878* (2013.01); *H04L 25/08* (2013.01); *H04L 25/14* (2013.01); *H04L 2025/03363* (2013.01); *H04L 2025/03426* (2013.01); *H04L 2025/03789* (2013.01)

(56) References Cited

U.S. PATENT DOCUMENTS

| | | |
|---|---|---|
| 3,939,468 A | 2/1976 | Mastin |
| 4,206,316 A | 6/1980 | Bancroft et al. |
| 4,276,543 A | 6/1981 | Miller et al. |
| 4,774,498 A | 9/1988 | Traa |
| 4,897,657 A | 1/1990 | Brubaker |
| 5,017,924 A | 5/1991 | Guiberteau et al. |
| 5,459,465 A | 10/1995 | Kagey |
| 5,471,480 A * | 11/1995 | You .................... G11C 29/40 365/201 |
| 5,510,736 A | 4/1996 | Van |
| 5,553,097 A | 9/1996 | Dagher |
| 5,748,948 A | 5/1998 | Yu et al. |
| 5,945,935 A | 8/1999 | Kusumoto et al. |
| 6,226,330 B1 | 5/2001 | Mansur |
| 6,232,908 B1 | 5/2001 | Nakaigawa |
| 6,278,740 B1 | 8/2001 | Nordyke |
| 6,346,907 B1 | 2/2002 | Dacy et al. |
| 6,384,758 B1 | 5/2002 | Michalski et al. |
| 6,396,329 B1 | 5/2002 | Zerbe |
| 6,400,302 B1 | 6/2002 | Amazeen et al. |
| 6,462,584 B1 | 10/2002 | Proebsting |
| 6,563,382 B1 | 5/2003 | Yang |
| 6,624,699 B2 | 9/2003 | Yin et al. |
| 6,839,587 B2 | 1/2005 | Yonce |
| 6,879,816 B2 | 4/2005 | Bult et al. |
| 6,888,483 B2 | 5/2005 | Mulder |
| 6,972,701 B2 | 12/2005 | Jansson |
| 7,075,996 B2 | 7/2006 | Simon et al. |
| 7,167,523 B2 | 1/2007 | Mansur |
| 7,188,199 B2 | 3/2007 | Leung et al. |
| 7,199,728 B2 | 4/2007 | Dally et al. |
| 7,269,212 B1 | 9/2007 | Chau et al. |
| 7,285,977 B2 * | 10/2007 | Kim .................... H03K 5/082 326/30 |
| 7,372,390 B2 | 5/2008 | Yamada |
| 7,397,302 B2 | 7/2008 | Bardsley et al. |
| 7,420,499 B2 * | 9/2008 | Sakata .................. H03M 1/1023 341/118 |
| 7,528,758 B2 | 5/2009 | Ishii |
| 7,656,321 B2 | 2/2010 | Wang |
| 7,683,720 B1 | 3/2010 | Yehui et al. |
| 7,688,102 B2 | 3/2010 | Bae et al. |
| 7,697,915 B2 | 4/2010 | Behzad et al. |
| 7,804,361 B2 | 9/2010 | Lim et al. |
| 7,957,472 B2 | 6/2011 | Wu et al. |
| 8,000,664 B2 | 8/2011 | Khorram |
| 8,030,999 B2 | 10/2011 | Chatterjee et al. |
| 8,106,806 B2 | 1/2012 | Toyomura et al. |
| 8,159,375 B2 | 4/2012 | Abbasfar |
| 8,159,376 B2 | 4/2012 | Abbasfar |
| 8,183,930 B2 | 5/2012 | Kawakami et al. |
| 8,279,094 B2 | 10/2012 | Abbasfar |
| 8,295,336 B2 | 10/2012 | Lutz et al. |
| 8,305,247 B2 | 11/2012 | Pun et al. |
| 8,547,272 B2 | 10/2013 | Nestler et al. |
| 8,581,824 B2 | 11/2013 | Baek et al. |
| 8,604,879 B2 | 12/2013 | Mourant et al. |
| 8,643,437 B2 | 2/2014 | Chiu et al. |
| 8,674,861 B2 | 3/2014 | Matsuno et al. |
| 8,687,968 B2 | 4/2014 | Nosaka et al. |
| 8,791,735 B1 | 7/2014 | Shibasaki |
| 8,831,440 B2 | 9/2014 | Yu et al. |
| 8,841,936 B2 | 9/2014 | Nakamura |
| 8,860,590 B2 | 10/2014 | Yamagata et al. |
| 9,069,995 B1 | 6/2015 | Cronie |
| 9,083,576 B1 | 7/2015 | Hormati |
| 9,106,465 B2 | 8/2015 | Walter |
| 9,148,087 B1 | 9/2015 | Tajalli |
| 9,178,503 B2 | 11/2015 | Hsieh |
| 9,281,785 B2 | 3/2016 | Sjöland |
| 9,292,716 B2 | 3/2016 | Winoto et al. |
| 9,300,503 B1 | 3/2016 | Holden et al. |
| 9,362,974 B2 | 6/2016 | Fox et al. |
| 9,509,437 B2 | 11/2016 | Shokrollahi |
| 10,003,315 B2 | 6/2018 | Tajalli |
| 2001/0006538 A1 | 7/2001 | Simon et al. |
| 2002/0050861 A1 | 5/2002 | Nguyen et al. |
| 2002/0067297 A1 * | 6/2002 | Donovan ............ H03M 1/0678 341/120 |
| 2002/0149508 A1 | 10/2002 | Hamashita |
| 2002/0158789 A1 | 10/2002 | Yoshioka et al. |
| 2002/0174373 A1 | 11/2002 | Chang |
| 2003/0016763 A1 | 1/2003 | Doi et al. |
| 2003/0085763 A1 | 5/2003 | Schrodinger et al. |
| 2003/0132791 A1 | 7/2003 | Hsieh |
| 2003/0160749 A1 | 8/2003 | Tsuchi |
| 2003/0174023 A1 | 9/2003 | Miyasita |
| 2003/0184459 A1 | 10/2003 | Engl |
| 2003/0218558 A1 | 11/2003 | Mulder |
| 2003/0227841 A1 | 12/2003 | Tateishi et al. |
| 2004/0027185 A1 | 2/2004 | Fiedler |
| 2004/0169529 A1 | 9/2004 | Afghani et al. |
| 2004/0194848 A1 | 10/2004 | Sauer |
| 2005/0057379 A1 | 3/2005 | Jansson |
| 2005/0134380 A1 | 6/2005 | Nairn |
| 2005/0174146 A1 * | 8/2005 | Chauhan ............ H03K 19/01858 326/86 |
| 2005/0270098 A1 | 12/2005 | Zhang et al. |
| 2006/0036668 A1 | 2/2006 | Jaussi et al. |
| 2006/0097786 A1 | 5/2006 | Su et al. |
| 2006/0103463 A1 | 5/2006 | Lee et al. |
| 2006/0192598 A1 | 8/2006 | Baird et al. |
| 2006/0194598 A1 | 8/2006 | Kim et al. |
| 2007/0009018 A1 | 1/2007 | Wang |
| 2007/0176708 A1 | 8/2007 | Otsuka et al. |
| 2007/0182487 A1 | 8/2007 | Ozasa et al. |
| 2007/0188367 A1 | 8/2007 | Yamada |
| 2007/0201546 A1 | 8/2007 | Lee |
| 2008/0001626 A1 | 1/2008 | Bae et al. |
| 2008/0165841 A1 | 7/2008 | Wall et al. |
| 2008/0187037 A1 | 8/2008 | Bulzacchelli et al. |
| 2009/0090333 A1 | 4/2009 | Spadafora et al. |
| 2009/0115523 A1 | 5/2009 | Akizuki et al. |
| 2009/0212861 A1 | 8/2009 | Lim et al. |
| 2009/0251222 A1 | 10/2009 | Khorram |
| 2009/0323864 A1 | 12/2009 | Tired |
| 2010/0142610 A1 * | 6/2010 | Stojanovic ............ H04L 25/063 375/232 |
| 2010/0148819 A1 | 6/2010 | Bae et al. |
| 2010/0156691 A1 | 6/2010 | Taft |
| 2010/0219781 A1 | 9/2010 | Kuwamura |
| 2010/0235673 A1 | 9/2010 | Abbasfar |
| 2010/0271107 A1 | 10/2010 | Tran et al. |
| 2010/0283894 A1 | 11/2010 | Horan et al. |
| 2011/0028089 A1 | 2/2011 | Komori |
| 2011/0032977 A1 | 2/2011 | Hsiao et al. |
| 2011/0051854 A1 | 3/2011 | Kizer et al. |
| 2011/0057727 A1 * | 3/2011 | Cranford, Jr. .......... H03F 1/3211 330/253 |
| 2011/0074488 A1 | 3/2011 | Broyde et al. |

(56) References Cited

U.S. PATENT DOCUMENTS

| | | |
|---|---|---|
| 2011/0084737 A1 | 4/2011 | Oh et al. |
| 2011/0096054 A1 | 4/2011 | Cho et al. |
| 2011/0103508 A1 | 5/2011 | Mu et al. |
| 2011/0133816 A1 | 6/2011 | Wu et al. |
| 2011/0150495 A1 | 6/2011 | Nosaka et al. |
| 2011/0156819 A1 | 6/2011 | Kim et al. |
| 2011/0276733 A1* | 11/2011 | Perego ............ G06F 13/1684 710/71 |
| 2011/0291758 A1 | 12/2011 | Hsieh |
| 2012/0008662 A1 | 1/2012 | Gardiner |
| 2012/0025911 A1 | 2/2012 | Zhao et al. |
| 2012/0044021 A1 | 2/2012 | Yeh et al. |
| 2012/0133438 A1 | 5/2012 | Tsuchi et al. |
| 2012/0213267 A1* | 8/2012 | Stojanovic ............ H04L 25/497 375/232 |
| 2012/0213299 A1 | 8/2012 | Cronie et al. |
| 2013/0027089 A1* | 1/2013 | Huang ............ G01R 19/16552 327/87 |
| 2013/0049863 A1 | 2/2013 | Chiu et al. |
| 2013/0106513 A1 | 5/2013 | Cyrusian et al. |
| 2013/0114663 A1 | 5/2013 | Ding et al. |
| 2013/0147553 A1 | 6/2013 | Iwamoto |
| 2013/0195155 A1 | 8/2013 | Pan et al. |
| 2013/0214869 A1* | 8/2013 | Matsuzaki ............ G05F 1/567 331/70 |
| 2013/0215954 A1 | 8/2013 | Beukema et al. |
| 2013/0229294 A1 | 9/2013 | Matsuno et al. |
| 2013/0243127 A1* | 9/2013 | Chmelar ............ H04L 25/03057 375/316 |
| 2013/0259113 A1 | 10/2013 | Kumar |
| 2013/0307614 A1 | 11/2013 | Dai |
| 2013/0334985 A1 | 12/2013 | Kim et al. |
| 2014/0119479 A1 | 5/2014 | Tajalli |
| 2014/0176354 A1 | 6/2014 | Yang |
| 2014/0177696 A1 | 6/2014 | Hwang |
| 2014/0203794 A1 | 7/2014 | Pietri et al. |
| 2014/0266440 A1 | 9/2014 | Itagaki et al. |
| 2014/0269130 A1 | 9/2014 | Maeng et al. |
| 2014/0312876 A1 | 10/2014 | Hanson et al. |
| 2015/0049798 A1 | 2/2015 | Hossein et al. |
| 2015/0070201 A1 | 3/2015 | Dedic et al. |
| 2015/0139340 A1* | 5/2015 | Hansen ............ H04L 25/0228 375/257 |
| 2015/0146771 A1 | 5/2015 | Walter |
| 2015/0198647 A1 | 7/2015 | Atwood et al. |
| 2016/0013954 A1 | 1/2016 | Shokrollahi et al. |
| 2016/0197747 A1 | 7/2016 | Ulrich et al. |
| 2017/0214374 A1 | 7/2017 | Tajalli |

OTHER PUBLICATIONS

Oh, Dan , et al., ""Pseudo-Differential Vector Signaling for Noise Reduction in Single-Ended Signaling"", DesignCon 2009, (22 pages).

Schneider, J. , et al., ""ELEC301 Project: Building an Analog Computer"", http://www.clear.rice.edu/elec301/Projects99/anlgcomp/, Dec. 19, 1999, (9 pages).

Tierney, J. , "A Digital Frequency Synthesizer", Audio and Electroacoustics, IEEE Transactions, pp. 48-57, vol. 19, No. 1, Abstract, Mar. 1971, (1 page).

Kim, Kyu-Young , et al., "8 mW 1.65-Gbps continuous-time equalizer with clock attenuation detection for digital display interface", Analog Integrated Circuits and Signal Processing, Kluwer Academic Publishers, vol. 63, No. 2, Oct. 11, 2009, 329-337 (9 pages).

Takahashi, Masayoshi , et al., "A 2-GHz Gain Equalizer for Analog Signal Transmission Using Feedforward Compensation by a Low-Pass Filter", IEICE Transactions on Fundamentals of Electronics, vol. E94A, No. 2, Feb. 2011, 611-616 (6 pages).

Wang, Hui , et al., "Equalization Techniques for High-Speed Serial Interconnect Transceivers", Solid-State and Integrated-Circuit Technology, 9th International Conference on ICSICT, Piscataway, NJ, Oct. 20, 2008, 1-4 (4 pages).

* cited by examiner

| A | B | C | D | a+c? | b+d? | c+d? | a+b? | c+b? | d+a? | R₀ | R₁ | R₂ |
|---|---|---|---|------|------|------|------|------|------|-----|-----|-----|
| 1 | -1/3 | -1/3 | -1/3 | 2/3 | -2/3 | -2/3 | 2/3 | -2/3 | 2/3 | 4/3 | -4/3 | -4/3 |
| -1/3 | 1 | -1/3 | -1/3 | -2/3 | 2/3 | -2/3 | 2/3 | 2/3 | -2/3 | -4/3 | -4/3 | 4/3 |
| -1/3 | -1/3 | 1 | -1/3 | 2/3 | 2/3 | 2/3 | -2/3 | 2/3 | -2/3 | 4/3 | 4/3 | 4/3 |
| -1/3 | -1/3 | -1/3 | 1 | -2/3 | 2/3 | 2/3 | -2/3 | -2/3 | 2/3 | -4/3 | 4/3 | -4/3 |
| -1 | 1/3 | 1/3 | 1/3 | 2/3 | -2/3 | 2/3 | -2/3 | 2/3 | -2/3 | 4/3 | 4/3 | 4/3 |
| 1/3 | -1 | 1/3 | 1/3 | -2/3 | 2/3 | 2/3 | -2/3 | -2/3 | 2/3 | -4/3 | 4/3 | -4/3 |
| 1/3 | 1/3 | -1 | 1/3 | 2/3 | 2/3 | -2/3 | 2/3 | -2/3 | 2/3 | 4/3 | -4/3 | -4/3 |
| 1/3 | 1/3 | 1/3 | -1 | -2/3 | -2/3 | -2/3 | 2/3 | 2/3 | -2/3 | -4/3 | -4/3 | 4/3 |

*Fig. 8*

CIRCUITS FOR EFFICIENT DETECTION OF VECTOR SIGNALING CODES FOR CHIP-TO-CHIP COMMUNICATION

CROSS-REFERENCE TO RELATED APPLICATIONS

This application is a continuation of U.S. application Ser. No. 15/812,917, filed Nov. 14, 2017, entitled "Circuits for Efficient Detection of Vector Signaling Codes for Chip-to-Chip Communication", which is a continuation of U.S. application Ser. No. 15/271,065, filed Sep. 20, 2016, entitled "Circuits for Efficient Detection of Vector Signaling Codes for Chip-to-Chip Communication," which is a continuation of U.S. application Ser. No. 15/070,911, filed Mar. 15, 2016, entitled "Circuits for Efficient Detection of Vector Signaling Codes For Chip-to-Chip Communication Using Sums of Differences," which is a continuation of U.S. application Ser. No. 13/895,206 filed May 15, 2013, entitled "Circuits for Efficient Detection of Vector Signaling Codes For Chip-to-Chip Communication Using Sums of Differences", all of which are hereby incorporated herein by reference in their entirety.

REFERENCES

The following references are herein incorporated by reference in their entirety for all purposes:

U.S. Patent Publication No. 2011/0268225 of application Ser. No. 12/784,414, filed May 20, 2010, naming Harm Cronie and Amin Shokrollahi, entitled "Orthogonal Differential Vector Signaling" (hereinafter "Cronie I");

U.S. Patent Publication No. 2011/0302478 of application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II");

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereinafter "Cronie III").

U.S. patent application Ser. No. 13/463,742, filed May 3, 2012, naming Harm Cronie and Amin Shokrollahi, entitled "Finite State Encoders and Decoders for Vector Signaling Codes" (hereinafter called "Cronie IV").

U.S. patent application Ser. No. 13/844,331, filed Mar. 15, 2013, naming Harm Cronie and Brian Holden, entitled "Sorting Decoder" (hereinafter called "Cronie V".)

U.S. patent application Ser. No. 13/603,107, filed Sep. 4, 2012, naming Brian Holden and Amin Shokrollahi, entitled "Methods and Systems for Selection of Unions of Vector Signaling Codes for Power and Pin Efficient Chip-to-Chip Communication" (hereinafter "Holden I").

U.S. patent application Ser. No. 13/842,740, filed Mar. 15, 2013, naming Brian Holden, Amin Shokrollahi, and Anant Singh, entitled "Methods and Systems for Skew Tolerance in and Advanced Detectors for Vector Signaling Codes for Chip-to-Chip Communication" (hereinafter "Holden II").

TECHNICAL FIELD

The present invention relates to communications in general and in particular to the transmission of signals capable of conveying information and detection of those signals in chip-to-chip communication.

BACKGROUND

In communication systems, a goal is to transport information from one physical location to another. It is typically desirable that the transport of this information is reliable, is fast and consumes a minimal amount of resources. One common information transfer medium is the serial communications link, which may be based on a single wire circuit relative to ground or other common reference, multiple such circuits relative to ground or other common reference, or multiple circuits used in relation to each other. A common example of the latter uses differential signaling ("DS"). Differential signaling operates by sending a signal on one wire and the opposite of that signal on a matching wire. The signal information is represented by the difference between the wires, rather than their absolute values relative to ground or other fixed reference.

There are a number of signaling methods that maintain the desirable properties of DS while increasing pin efficiency over DS. Vector signaling is a method of signaling. With vector signaling, a plurality of signals on a plurality of wires is considered collectively although each of the plurality of signals might be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector might refer to the number of degrees of freedom of signals on the plurality of wires instead of exactly the number of wires in the plurality of wires.

With binary vector signaling, each component or "symbol" of the vector takes on one of two possible values. With non-binary vector signaling, each symbol has a value that is a selection from a set of more than two possible values. Any suitable subset of a vector signaling code denotes a "subcode" of that code. Such a subcode may itself be a vector signaling code.

Some vector signaling methods are described in Cronie I, Cronie II, Cronie III, Cronie IV, and Cronie V. While non-binary vector signaling methods can provide substantial improvements regarding the tradeoff of pin efficiency, power efficiency and noise resilience as compared to traditional signaling methods, there are some applications wherein additional improvements are possible, and sometimes necessary.

BRIEF SUMMARY

In a detection circuit, inputs correspond to received indications of vector signaling code words received by a first integrated circuit from a second integrated circuit. In a preferred embodiment, the number of inputs is four and the detection circuit compares a first pair of the inputs to obtain a first difference result and compares a second pair of inputs, disjoint from the first pair of inputs, to obtain a second difference result. The first difference result and the second difference result are then summed to form an output function. A system might use a plurality of such detection circuits to arrive at an input word.

In one embodiment, each input is from the set $\{-1, -\frac{1}{3}, \frac{1}{3}, 1\}$, the vector signaling code comprises the union of all permutations of the symbol set $\{1, -\frac{1}{3}, -\frac{1}{3}, -\frac{1}{3}\}$ and all permutations of the symbol set $\{-1, \frac{1}{3}, \frac{1}{3}, \frac{1}{3}\}$, the system uses three of the detection circuits, and the eight possible vector signaling code words encode for three input bits.

In accordance with at least one embodiment of the invention, circuits and systems are described for the efficient reception and detection of vector signal coded data transmitted over physical channels such that the signals transmitted are resilient to common mode noise, do not require a common reference at the transmission and reception points, and can produce a higher pin efficiency than conventional differential signaling with relatively low power dissipation for encoding and decoding. In some embodiments, different voltage, current, etc. levels are used for signaling and more than two levels might be used, such as a ternary sparse signaling code wherein each wire signal has one of three values. The decoder can be a 4×4 Hadamard matrix decoder to decode a Hadamard matrix code with two differences/comparisons followed by a summation.

Hardware elements might be provided to provide storage for symbols of input information used for selecting code words, processing hardware to convert symbols to signals, parsing symbols into separate partitions, storing results, and providing the partitions in sequence as signals. Various embodiments are given with reference to specific hardware implementations of small area and low power dissipation. In hardware, a "function" might be implemented using specific circuit elements, active or passive, or might be implemented as a consequence of connections of a circuit interconnection. For example, a summation function might be implemented by wiring two current sources in parallel to form a three-wire junction such that the current on one wire of the connection is the sum (or inverse of the sum) of the currents on the other two wires. Alternatively, a particular circuit element could receive two physical values and output their sum.

This Brief Summary is provided to introduce a selection of concepts in a simplified form that are further described below in the Detailed Description. This Brief Summary is not intended to identify key or essential features of the claimed subject matter, nor is it intended to be used as an aid in determining the scope of the claimed subject matter. Other objects and/or advantages of the present invention will be apparent to one of ordinary skill in the art upon review of the Detailed Description and the included drawings.

BRIEF DESCRIPTION OF THE DRAWINGS

Various embodiments in accordance with the present disclosure will be described with reference to the drawings. Same numbers are used throughout the disclosure and figures to reference like components and features.

FIG. 8 is a table illustrating logical values that might appear at various points in a detector in accordance with at least one embodiment of the invention.

DETAILED DESCRIPTION

Conventional communications systems receivers operate on individual wires or communications channels (i.e., single-ended signaling) or on pairs of wires or communications channels (i.e., differential signaling). In either case, a received signal is detected by comparison of a received value against a reference; for single-ended signaling, the reference may be a known voltage level such as ground or a calculated or predetermined offset voltage, while a differential receiver detects the signal of one wire in the pair in comparison to the signal of the other wire in the pair.

Figure 1:
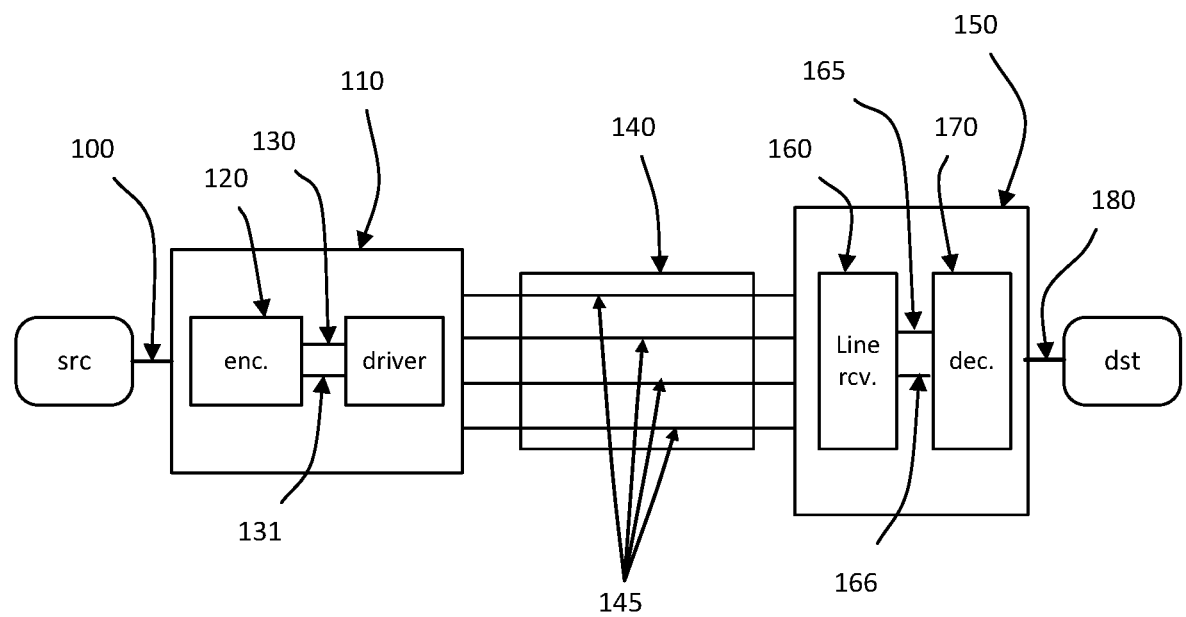
FIG. 1 is a schematic diagram that depicts aspects of an example multiple wire communications channel utilizing encoding and decoding in accordance with at least one embodiment of the invention.

Such communications channels may be extended to groups of wires carrying signals that collectively represent an encoded value. FIG. 1 is a block diagram showing communications channel 140 connecting transmitting device 110 to receiving device 150 using an example a group of four wires 145 to communicate source data 100 to destination 180 using a vector signaling code produced by encoder 120 and interpreted by decoder 170. Also shown are connectors 130, 131, line receiver 160 and connectors 165, 166.

Holden I describes an enhancement to the vector signaling code technique that makes use of the observation that the balance between complementary signals in a differential signaling channel need not be held exactly to zero. Thus, a vector signaling code may comprise the union of subcodes, each subcode being distinguishable by its unique nonzero code word sum.

Vector signaling code receivers may perform a first operation similar to that of a conventional receiver, by making a first determination of the symbol represented by the particular received signal of each wire or communications channel. However, complete detection of the vector signaling code can require identification not merely of the individual symbols of that code, but of the particular code word represented by the set of symbols communicated as a group. A vector signaling code receiver is said to "detect" vector signaling code C if for each code word c, the receiver produces a valid and unique result Sc, which may directly correspond to receive result R, or may produce R via a mapping operation.

Holden II describes the use of weighted multi-input comparators for detection of vector signaling codes. A weighted multi-input comparator with coefficients $a_0, a_1, \ldots, a_{m-1}$ is a circuit that accepts as its input a vector $(x_0, x_1, \ldots, x_{m-1})$ and outputs the signals indicated in Equation 1, with the definition of the sign-function being $\text{sign}(x)=+1$ if $x>0$, $\text{sign}(x)=-1$ if $x<0$, and $\text{sign}(x)$ is undefined if $x=0$.

$$\text{Output}=\text{sign}(a_0 * x_0 + \ldots + a_{m-1} * x_{m-1}) \quad \text{(Eqn. 1)}$$

A collection of such comparators each having distinct sets of input weights may serve as a detector for a vector signaling code.

Efficient Computational Element

In a detection circuit, inputs correspond to received indications of vector signaling code words received by a first integrated circuit from a second integrated circuit. In a preferred embodiment, the number of inputs is four and the detection circuit compares a first pair of the inputs to obtain a first difference result and compares a second pair of inputs, disjoint from the first pair of inputs, to obtain a second difference result. The first difference result and the second difference result are then summed to form an output function. A system might use a plurality of such detection circuits to arrive at an input word.

In one embodiment, each input is from the set {−1, −⅓, ⅓, ⅓}, the vector signaling code comprises the union of all permutations of the symbol set {1, −⅓, −⅓, −⅓} and all permutations of the symbol set {−1, ⅓, ⅓, ⅓}, the system uses three of the detection circuits, and the eight possible vector signaling code words encode for three input bits.

With the detection circuit performing differences ahead of performing summation, it becomes possible to provide for lowered distributed impedance and better high frequency response. In part, this is a result of capacitance appearing at lower impedance points rather than higher impedance points.

In accordance with at least one embodiment of the invention, a code herein referred to as "H4" is described. H4 is a balanced, non-sparse vector signaling code of four symbols, comprising the union of all permutations of the symbol set {1, −⅓, −⅓, −⅓} and all permutations of the symbol set {−1, ⅓, ⅓, ⅓}.

An efficient component of a detector for H4 code performs calculations of the form shown in Equation 2 where J, K, L, M are variables representing the symbol values of the four input signals values.

$$R=(J+L)-(K+M) \quad \text{(Eqn. 2)}$$

It may be noted that applying three instances of Equation 2 with different permutations of receive signal input values to the four variables is sufficient to detect each code word of H4. As one example and without limitation, the input permutations producing the three results R0, R1, R2 based on Equations 3, 4 and 5 are sufficient to unambiguously identify each code word of vector signaling code H4 as represented by receive signal input values A, B, C, D.

$$R0=(A+C)-(B+D) \quad \text{(Eqn. 3)}$$

$$R1=(C+D)-(A+B) \quad \text{(Eqn. 4)}$$

$$R2=(C+B)-(D+A) \quad \text{(Eqn. 5)}$$

Architecturally, it is convenient to perform such detection operations at or near the receiver input, and high speed capability requires an efficient, high performance embodiment.

Figures 2A, 2B, 2C:
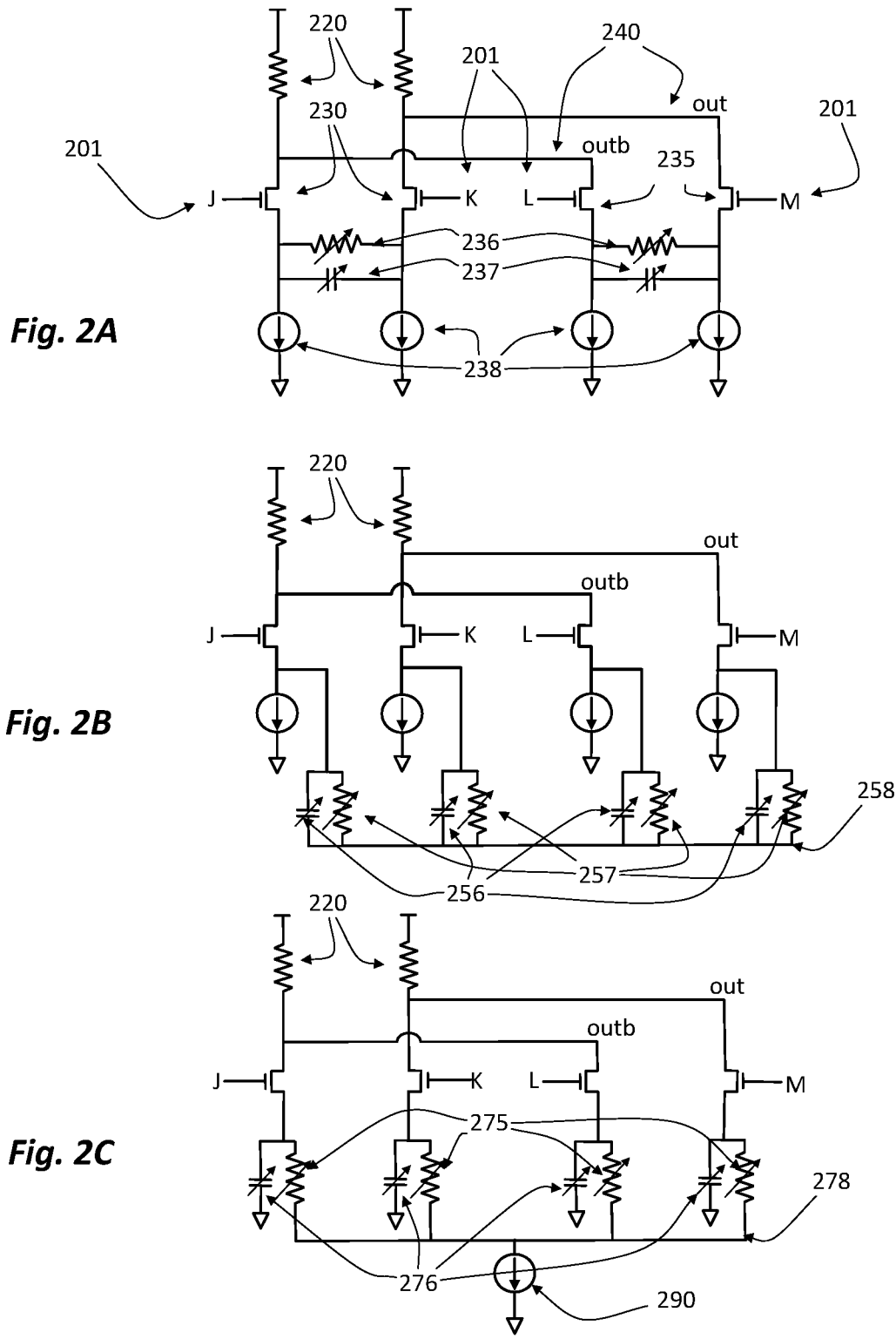
FIGS. 2A, 2B and 2C are schematic diagrams of example differential amplifier stage embodiments in accordance with the invention.

FIG. 2A is a schematic diagram of one example circuit performing the required calculation. It will be readily apparent to one familiar with the art that the difference of two sums function of Equation 2 may be regrouped using the associative rule into an equivalent form comprising a sum of two differences. These regrouped forms of Equations 3, 4, and 5 are shown as Equations 6, 7, and 8.

$$R0=(A-B)+(C-D) \quad \text{(Eqn. 6)}$$

$$R1=(C-A)+(D-B) \quad \text{(Eqn. 7)}$$

$$R2=(C-D)+(B-A) \quad \text{(Eqn. 8)}$$

FIG. 8 is a table illustrating logical values that might appear at various points in a detector in accordance with at least one embodiment of the invention as represented by the equations above. It should be understood that this is but one example of an implementation or a few variations thereof.

The four circuit inputs of FIG. 2A are labeled J, K, L, M as at 201, and the inputs are gate inputs to differential transistor pairs 230 and 235, each transistor pair herein referred to as a differential amplifier. These differential amplifiers share load resistors 220 providing the necessary sum function, with the inherent differential function within each of differential amplifier 230 and 235 providing the necessary difference elements. Thus, the complimentary outputs labeled out and outb at 240 represent the result of Equation 6, as an example, based on inputs J, K, L, M. Splitting the conventional current sink per differential pair into individual per-transistor current sinks 238 allows introduction of resistors 236 and capacitors 237 that provide a frequency-dependent gain characteristic for line equalization or peaking.

FIG. 2B is a schematic diagram of another embodiment of the invention. In this design, resistors 256 and capacitors 257 connect from the source of each transistor to a common node 258, providing a desirable frequency-dependent gain characteristic for equalization or signal peaking.

FIG. 2C is a schematic diagram of a further embodiment of the invention, where the common node 278 is used as a common connection to single current sink 290, rather than the multiple current sinks of FIG. 2B. Capacitors 276 are shown connecting between each transistor drain to ground, with capacitors 276 and resistors 275 again providing a desirable frequency-dependent gain characteristic for equalization or peaking.

It will be apparent to one skilled in the art that the functional equivalent of Equation 2, including specific examples such as illustrated by Equations. 6, 7, and 8, may be embodied by any of the circuits of FIGS. 2A-2C, given an appropriate mapping of receive signal input values A, B, C, D to circuit inputs J, K, L, M. It will also be apparent that the described circuit topology may be applied to compute equivalent detection functions for codes other than the example H4 code.

In at least one embodiment of the invention as represented in each schematic of FIGS. 2A-2C, one or both of the resistors and capacitors described as providing equalization or signal peaking are trimmable or variable, allowing the amplification and equalization or peaking characteristics to be adjusted. The initial value or adjusted value of the capacitors may include zero, without limitation. Load resistors 220 may be replaced by current sources, by current sources controlled by a common mode feedback, or by a combination of resistors and inductors to provide additional high-frequency peaking.

On-Chip Receive Signal Termination

At contemplated signal rates, conventional best practice might be to provide matched transmission line termination for current mode logic (CML) receive input signals. Examples in accordance with at least one embodiment of the invention are shown in FIGS. 3A-3C.

Figure 3A:
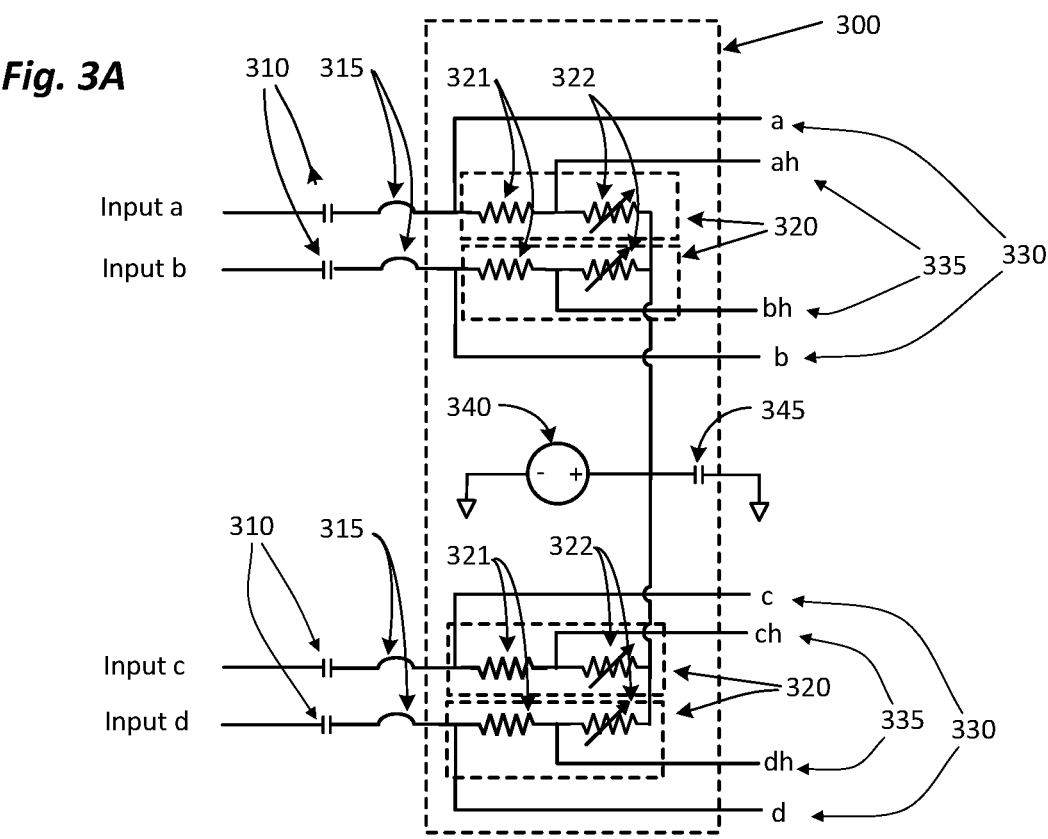
FIGS. 3A, 3B and 3C are schematic diagrams illustrating termination of receive inputs to a chip in accordance with at least one embodiment of the invention.
Figure 3B:
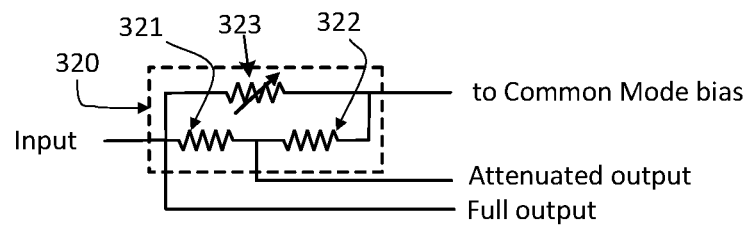
Figure 3C:
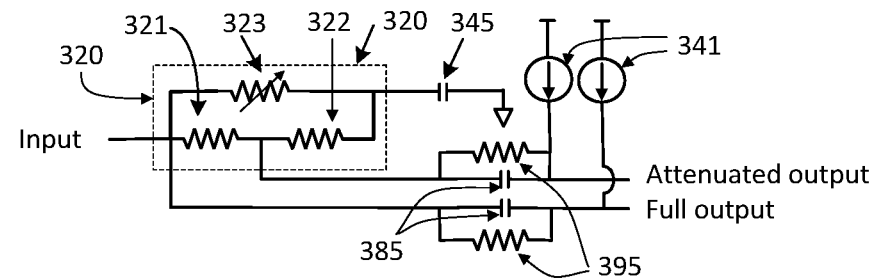

In FIG. 3A, signal inputs 301 labeled inputs a, b, c, and d are illustrated with external blocking capacitors 310, which optionally may be used to prevent DC current flow over the interconnection. The presence of impedance anomalies such as bond wires and bonding pads is suggested at 315, representing such known sources of signal degradation at high data rates.

In at least one embodiment, the same circuitry used for vector signaling code detection over example inputs a, b, c, d, also provides "legacy mode" support for, as an example, differential signal reception on the same inputs. Such selection of "legacy mode" may require support for greater signal level inputs (as those signals may be provided by different or earlier-generation components), and this extended-range input support may be obtained by attenuating large signal inputs before subsequent processing, as examples ah, bh, ch, dh at 335.

To provide this attenuation function, the termination resistance 320 is shown comprising components 321 and 322; as one example, they represent identical resistive values summing to the required termination impedance while also providing an attenuated output within allowable on-chip signal levels. Thus, signals 330 labeled a, b, c, d represent the full input signal level, while signals 335 labeled ah, bh, ch, dh represent, continuing the example, the same values attenuated to half amplitude. Subsequent processing circuits may select either full input signals or attenuated signals using, as an example, an analog multiplexer. The values of 321 and 322 need not be identical, and in some embodiments may be adjustable or trimmable, as illustrated by 322 of FIGS. 3A-3C.

Other embodiments in accordance with the invention utilize equivalent attenuator topologies known in the art, including so-called "T" and "PI" configurations, or eschew attenuation and combine elements 321 and 322 into a single resistive termination. One alternative embodiment of termination resistance 320 is shown in FIG. 3B, where components 321 and 322 provide the desired attenuation ratio, and component 323 is trimmed or adjusted to obtain the desired termination impedance.

In FIGS. 3A and 3B, all terminations 320 connect to common mode bias source 340 and common mode filter capacitor 345. The bias voltage provided by source 340 to subsequent active circuits can be circuit- and process-dependent; one typical value is 600 mV.

Another embodiment is illustrated in FIG. 3C, which provides level-shifting where blocking capacitor 310 is not used. Rather than utilizing a common bias source 340, the common termination node is coupled to ground via common mode filter capacitor 345, which may be shared across all terminations 320. The individual full-level and attenuated outputs are obtained through RF pass capacitors 385 and bias resistors 395, with the bias level of the receiver inputs set by current source 341 flow through the resistive path of 395 and 320.

Combined Multiplexer and Computation Element

Figure 4:
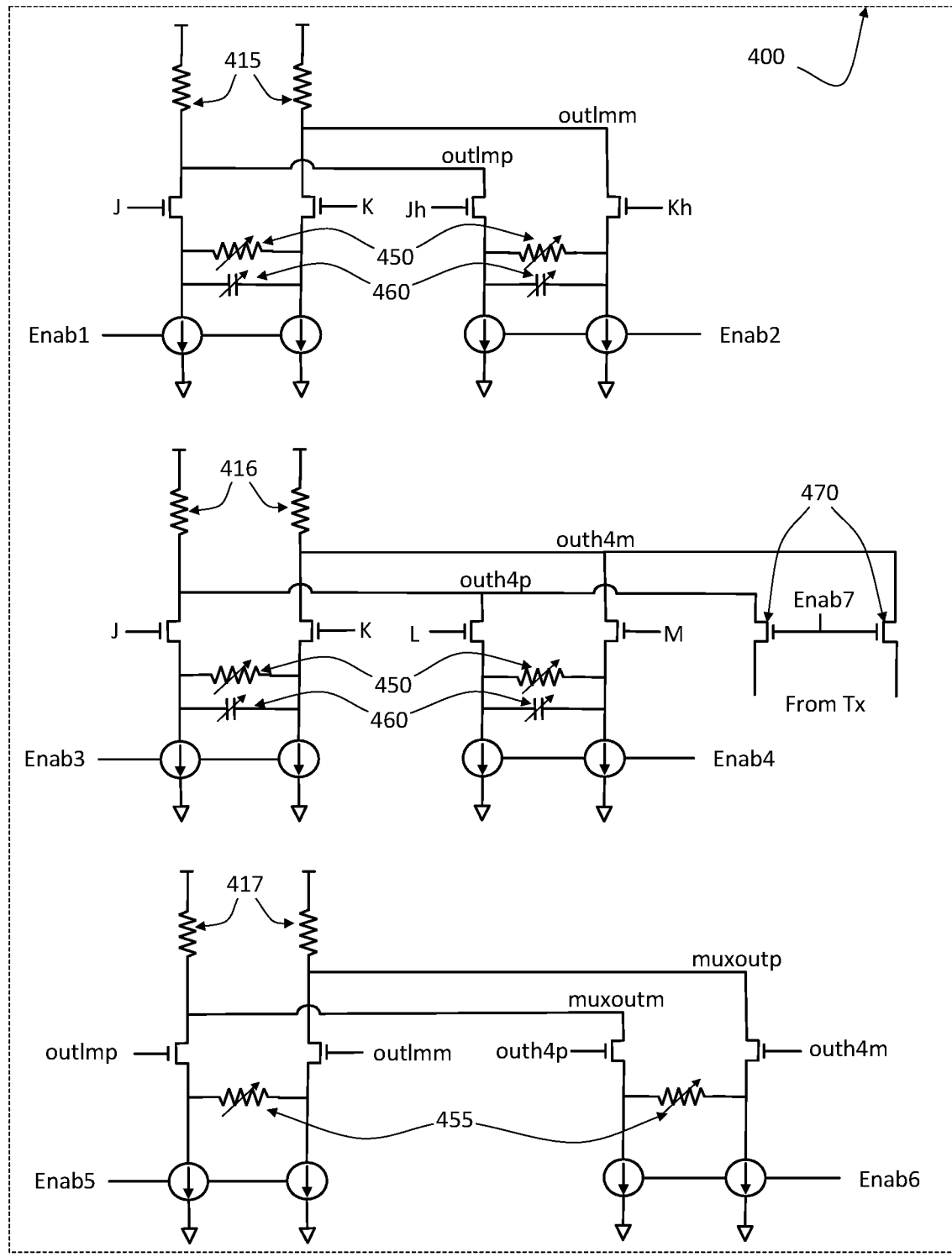
FIG. 4 is a schematic diagram of a circuit combining computation function, signal multiplexing, and adjustable gain and equalization or peaking, in accordance with at least one embodiment of the invention.

A described computational circuit as in any of FIGS. 2A-2C may be integrated with the suggested multiplexer function, as shown in the example circuit of FIG. 4. This example comprises three components; the first selects between the difference of inputs J and K, or the difference of attenuated inputs Jh and Kh; the second performs the computation of Equation 2 on inputs J, K, L, M, or provides internal loopback of this chip's transmit signals; and the final element selects between the outputs of the first or of the second components.

This staged topology has been found to minimize loading effects, thus providing optimum performance for the given process technology. The results allow embodiment of legacy mode operation with either attenuated input signals or full level input signals, an internal signal test mode, and/or vector signaling code detection.

Selectively enabling or disabling pairs of current sinks using the control signals Enab1 through Enab6 controls the multiplexer. As examples, inputs a and b may be selected instead of inputs ah and bh by enabling current sinks using Enab1 and disabling current sinks using Enab2, and then further selected by enabling current sinks using Enab5 and disabling current sinks using Enab6 to, as an example, support a legacy mode differential receiver behavior. Conversely, selection of the computed function based on inputs a, b, c, d may be selected by enabling current sinks using Enab3 and Enab4, and further selected by disabling current sinks using Enab5 and enabling current sinks using Enab6.

One embodiment incorporates a test mode loopback of local transmit signals, which may be obtained by enabling pass transistors 470 using control signal Enab7. It will be apparent to a practitioner of the art that this multiplexer may also be used for other input selections, including alternative mappings of wire signals to computed function inputs and/or a different computed function.

Inputs to an element 400 of FIG. 4 are J, K, L, M, Jh, Lh, and the Tx signals for loopback. The final outputs of element 400 are the complimentary values muxoutp and muxoutm. Resistive and capacitive elements 450 and 460 may be incorporated as previously described to provide input gain and/or frequency-dependent equalization or peaking, and resistive elements 455 provide for controllable overall gain at the final output stage. One or more of elements 450, 455, and 460 may be trimmable or adjustable, and/or may include capacitive values of zero if no frequency dependency is desired. One or more of load resistors shown as 415, 416, and 417 may be replaced by current sources, by current sources controlled by a common mode feedback, or by a combination of a resistor and inductor to provide additional high-frequency peaking.

Figure 7:
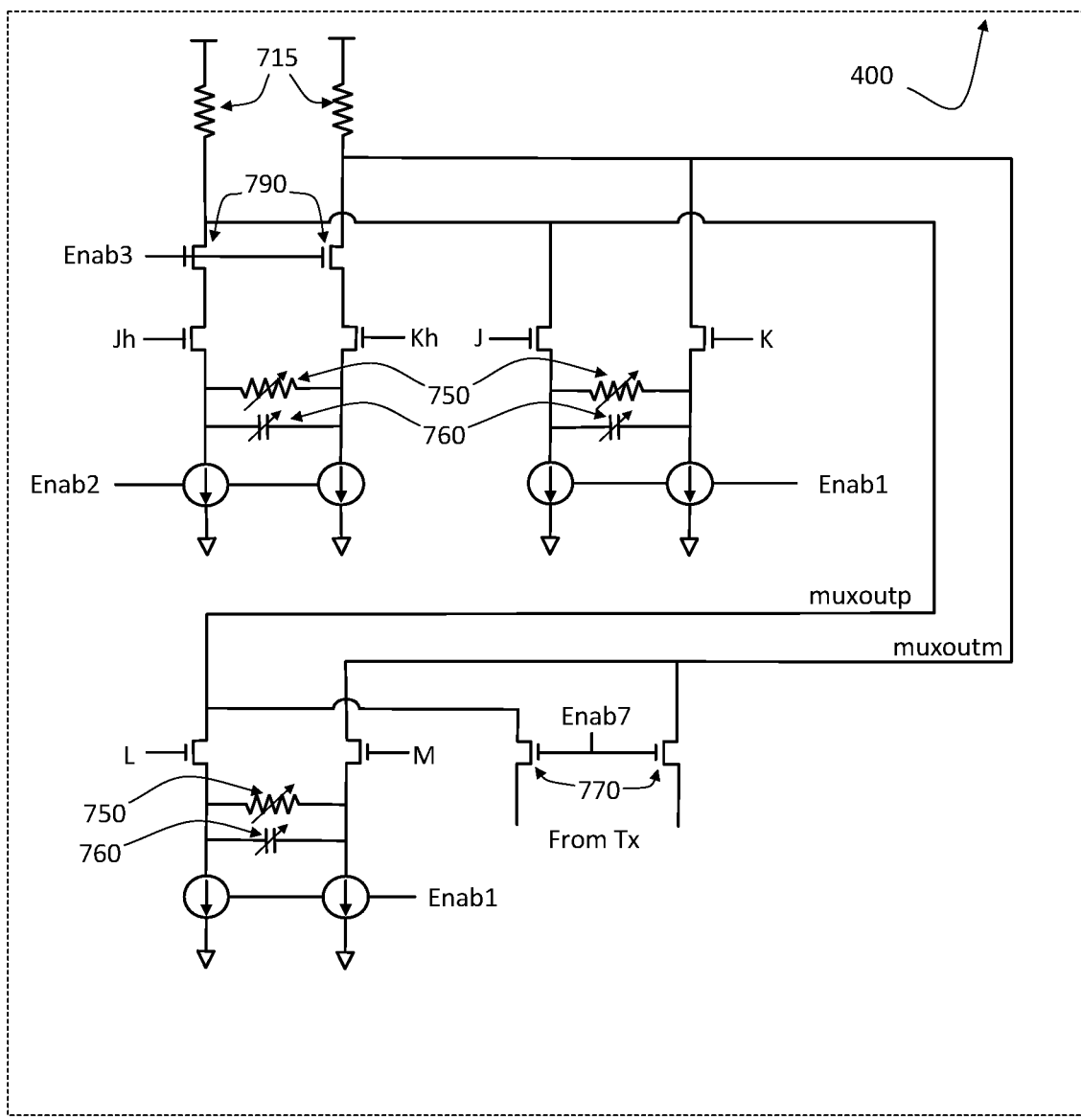
FIG. 7 is a schematic diagram of another circuit combining computation function signal multiplexing, and adjustable gain and equalization or peaking, in accordance with at least one embodiment of the invention.

An alternative embodiment of 400 is shown in FIG. 7 with all input multiplexing taking place in a single stage, rather than in the cascaded stages of FIG. 4. Cascode transistors 790 are shown as an optional addition to provide additional isolation of the half-level inputs (and their associated circuit parasitic capacitance) when not enabled by control Enab13. As with the previous example, resistors 750 and capacitors 760 may be utilized to adjust gain and/or high frequency peaking or compensation, and may be trimmable or adjustable. Load resistors 715 may also be replaced by current sources, by current sources controlled by a common mode feedback, or by a combination of resistors and inductors to provide additional high-frequency peaking.

Receive Input System for Vector Signaling Code

Figure 5:
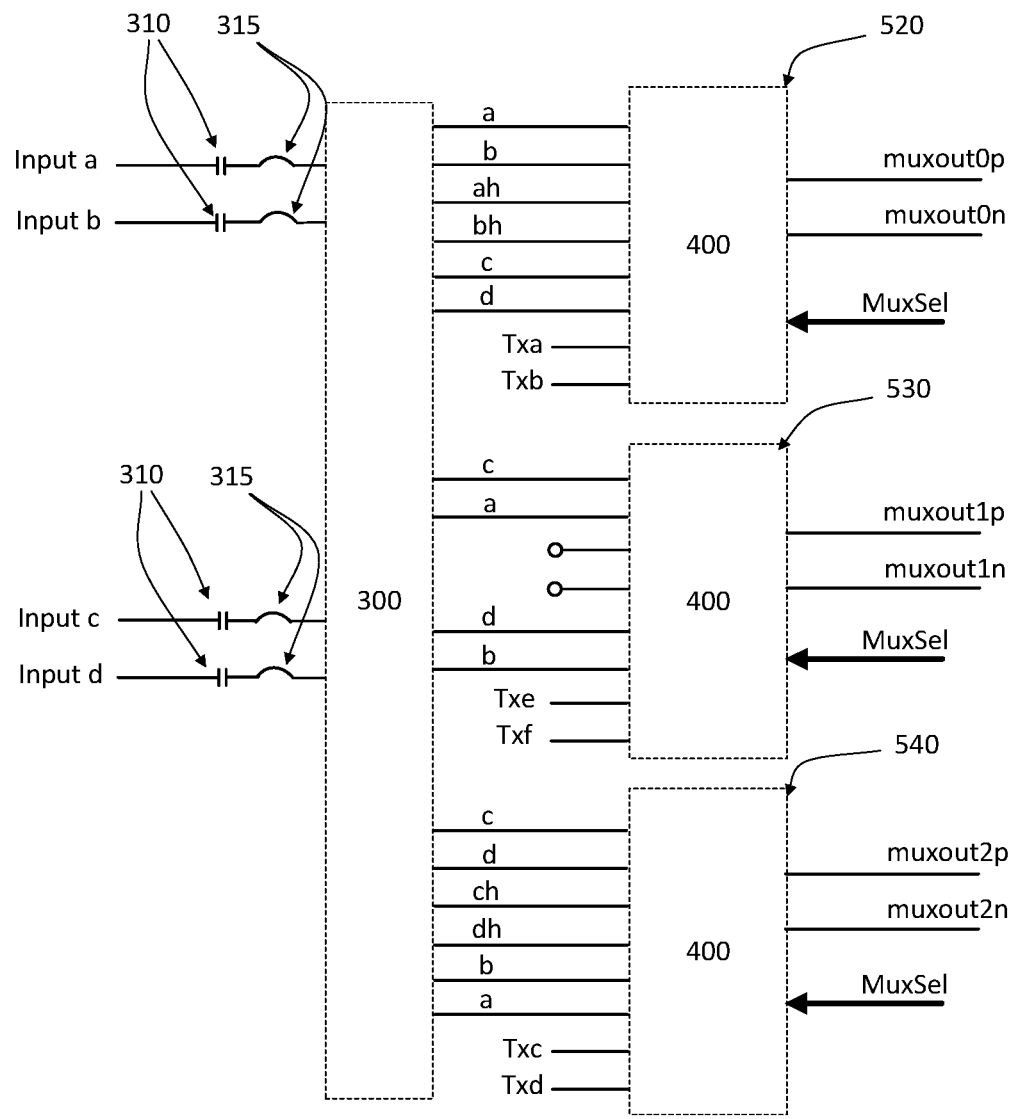
FIG. 5 is a block diagram showing use of the termination network of FIGS. 3A-3C and multiple instances of the circuit of FIG. 4 to provide a complete receive input system, in accordance with at least one embodiment of the invention.

The previously described circuits may be combined to produce a complete receive input system, as shown in the block diagram of FIG. 5. As an example, four chip-to-chip interconnection wires labeled as inputs a, b, c, d may be terminated as previously described for FIGS. 3A-3C by termination network 300.

Three instances of combined multiplexer and computation element 400 are used, each operating as previously described, e.g., for FIG. 4. The three instances of element 400 shown in FIG. 5 as 520, 530, and 540 respectively perform the computations associated with Equation 3, Equation 4, and Equation 5, based on the permutations of input signal connections shown. Under control of signals MuxSel (which within element 400 manipulate controls Enable1 through Enable7 of FIG. 4 as previously described) instance 520 may also alternatively provide a differential result of inputs a and b, a differential result of attenuated input signals ah and bh, or a loopback of internal signals Txa and Txb. Similarly, instance 540 may also alternatively provide a differential result of inputs c and d, a differential result of attenuated input signals ch and dh, or a loopback of internal signals Txc and Txd, and instance 530 may alternatively provide a loopback of internal signals Txe and Txf.

In one embodiment, the outputs of instance 530 are used only in non-legacy, non-loopback modes, thus the unused signal inputs of 530 are connected to a passive signal level such as ground. Although one familiar with the art would note that the instance of 530 could be simplified by removing unnecessary components associated with the unused functions, the amount of chip area wasted by not doing so is extremely small, while maintaining identical layouts for all instances provides consistent loading and delay characteristics throughout.

Other Variations

In at least one embodiment, all active transistor stages (e.g., of the circuit of FIG. 4 or the system of FIG. 5) are biased to be substantially in linear amplification mode. Thus, as examples, the signal outputs muxout0p, muxout1p, muxout2p, etc. of FIG. 5 represent analog signals, albeit ones that uniquely identify code words of the vector signaling code. Subsequent reception steps may include additional frequency- or time-domain equalization, sampling to capture particular time intervals, and slicing to obtain digital results. However, the possibility of incorporating such subsequent steps is not limiting; a minimal embodiment may utilize, as examples, simple threshold (e.g., Schmidt trigger) gates or high gain nonlinear amplifier stages to convert the outputs to digital values.

Figure 6:
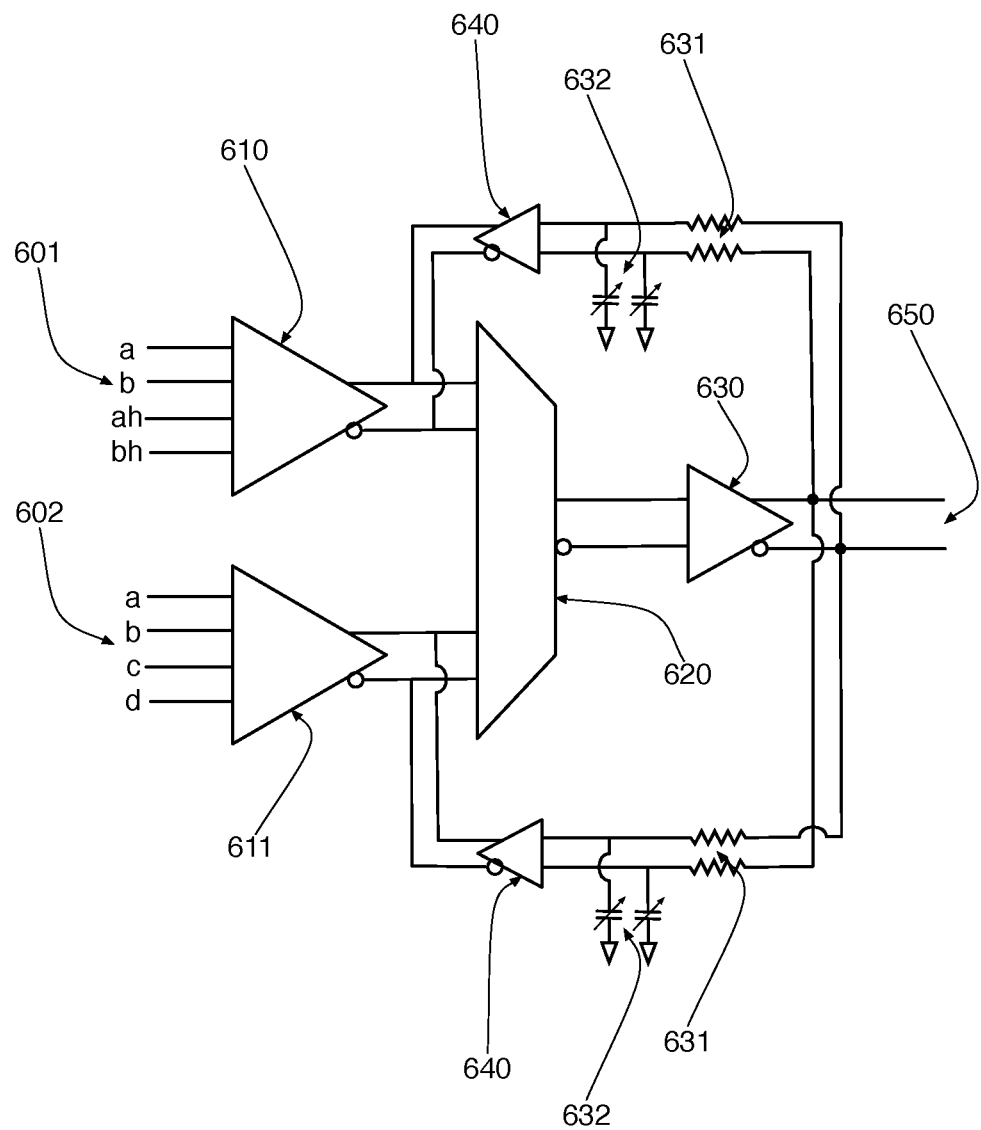
FIG. 6 is a block diagram showing use of signal feedback in accordance with at least one embodiment of the invention.

FIG. 6 provides a block diagram of another embodiment, incorporating feedback around the multiplexer and VGA stages to extend frequency response and allow greater receive bandwidth.

For purposes of illustration, the previously-described components of the receive detection system are shown in FIG. 6 as representing input/computational element 610 acting on inputs 601 and 611 acting upon inputs 602, multiplexer element 620 selecting between the input/computational elements, and output amplifier 630 producing signal outputs 650. As examples suggested by the symbols on their icons, 610 and 611 may further incorporate frequency-dependent peaking or filtering action, and 630 may further incorporate adjustable gain. Portions of outputs 650 are passed through networks comprised of resistors 631 and capacitors 632 to amplifiers 640, creating a controlled negative feedback loop that extends the linearity and bandwidth of included elements 620 and 630. As suggested by 632, elements of the feedback network may be adjustable or trimmable.

Other embodiments in accordance with the invention may interface to voltage-mode or high-impedance unterminated signal inputs, and/or communicate internal signals as voltage rather than current levels. Such embodiments may incorporate the known practice of using transmission gates as multiplexing elements.

The examples illustrate the use of vector signaling codes for point-to-point wire communications. However, this should not been seen in any way as limiting the scope of the described invention. The methods disclosed in this application are equally applicable to other communication media including optical and wireless communications. Thus, descriptive terms such as "voltage" or "signal level" should be considered to include equivalents in other measurement systems, such as "optical intensity", "RF modulation", etc. Similarly, specific examples provided herein are for purposes of description, and do not imply a limitation.

As used herein, "physical signal" includes any suitable behavior and/or attribute of a physical phenomenon capable of conveying information. In accordance with at least one embodiment of the invention, physical signals may be tangible and non-transitory. In accordance with at least one embodiment of the invention, interpreting a set of signals as selecting an object (e.g., a data object) includes selecting the object based at least in part on the set of signals and/or one or more attributes of the set of signals. In accordance with at least one embodiment of the invention, interpreting a set of signals as representing an object (e.g., a data object) includes determining and/or selecting the object based at least in part on a representation corresponding to the set of signals. In accordance with at least one embodiment of the invention, a same set of signals may be used to select and/or determine multiple distinct objects (e.g., data objects).

What is claimed is:

1. A method comprising:
    obtaining a set of at least four input signals via respective wires of a multi-wire bus;
    generating a set of comparator outputs at a set of multi-input comparators (MICs) in a first mode of operation, each MIC of the set of MICs connected to all of the wires of the multi-wire bus according to a respective input permutation of a plurality of input permutations associated with a vector signaling code, each MIC of the set of MICs generating a respective comparator output by forming a computation of the plurality set of at least four input signals received via the multi-wire bus according to the respective input permutation;
    generating at least two differential outputs at the set of MICs in a second mode of operation, each differential output generated by comparing signal values of input signals obtained on a respective pair of wires of the multi-wire bus; and
    obtaining a selection signal to configured the set of MICs to operate in the first or second mode of operation, wherein the selection signal disables one of the MICs in the second mode of operation.

2. The method of claim 1, wherein configuring a corresponding MIC of the set of MICs to operate in the second mode of operation comprises disconnecting signals that are not in the respective pair of wires from the corresponding MIC.

3. The method of claim 1, further comprising attenuating the set of input signals in the second mode of operation.

4. The method of claim 1, wherein the set of MICs generate three comparator outputs in the first mode of operation and two differential outputs in the second mode of operation.

5. The method of claim 1, wherein the set of MICs generate the set of comparator outputs on a differential output node via a plurality of differential pairs of transistors, each transistor of the plurality of differential pairs of transistors receiving a respective input signal of the set of at least four input signals.

6. The method of claim 5, wherein each transistor in the plurality of differential pairs of transistors are biased in a linear amplification mode.

7. An apparatus comprising:
    a multi-wire bus configured to provide a set of at least four input signals, each input signal of the set of at least four input signals provided via a respective wire of the multi-wire bus; and
    a set of multi-input comparators (MICs), each MIC of the set of MICs connected to all of the wires of the multi-wire bus according to a respective input permutation of a plurality of input permutations associated with a vector signaling code, the set of MICs configured to receive a selection signal for configuring the set of MICs to operated in a first or a second mode of operation, the set of MICs configured to:
        generate a set of comparator outputs in the first mode of operation, each comparator output generated by a corresponding MIC forming a computation of the set of at least four input signals according to the associated input permutation; and generate at least two differential outputs in the second mode of operation, each differential output generated by comparing signal values of input signals obtained on a respective pair of wires of the multi-wire bus, the selection signal further configured to disable at least one MIC of the set of MICs in the second mode of operation.

8. The apparatus of claim 7, wherein the selection signal is configured to disconnect signals that are not in the respective pair of wires from the corresponding MIC in the second mode of operation.

9. The apparatus of claim 7, further comprising an attenuation circuit configured to attenuate the set of input signals in the second mode of operation.

10. The apparatus of claim 7, wherein the set of MICs is configured to generate a set of three comparator outputs in the first mode of operation and to generate two differential outputs in the second mode of operation.

11. The apparatus of claim 7, wherein each MIC of the set of MICs comprises a plurality of differential pairs of transistors connected to a differential output node, the plurality of differential pairs of transistors receiving the set of at least four input signals according to the associated input permutation.

12. The apparatus of claim 11, wherein each transistor in the plurality of differential pairs of transistors are biased in a linear amplification mode.

* * * * *